Nov. 10, 1936.  W. A. CHRYST  2,060,554

SHOCK ABSORBER

Filed Jan. 9, 1935

INVENTOR
WILLIAM A. CHRYST
BY
Spencer, Hardman and Fehr
ATTORNEYS

Patented Nov. 10, 1936

2,060,554

UNITED STATES PATENT OFFICE 2,060,554

SHOCK ABSORBER

William A. Chryst, Dayton, Ohio, assignor to General Motors Corporation, Detroit, Mich., a corporation of Delaware Application January 9, 1935, Serial No. 946

3 Claims. (Cl. 188—89)

This invention relates to improvements in hydraulic shock absorbers.

It is among the objects of the present invention to provide a hydraulic shock absorber of compact and simple design, capable of controlling both the approaching and separating movements of the frame and axle of a vehicle.

Further objects and advantages of the present invention will be apparent from the following description, reference being had to the accompanying drawing wherein a preferred embodiment of the present invention is clearly shown.

Figure 1:
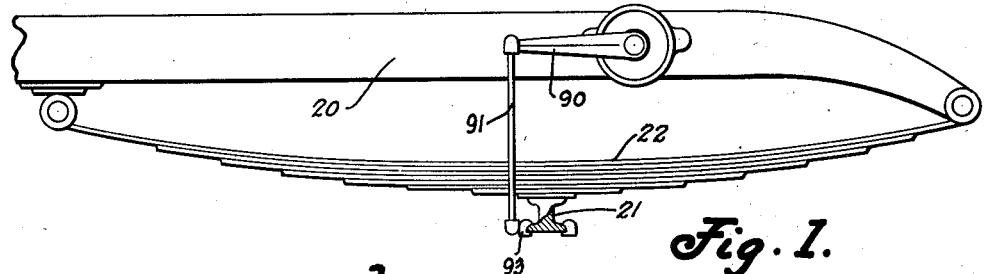
Figure 1 is a fragmentary side view of a vehicle chassis, having a shock absorber equipped with the present invention attached thereto.

Referring to the drawing, the numeral 20 designates the frame of the vehicle which is supported upon the axle 21 by springs 22.

Figure 3:
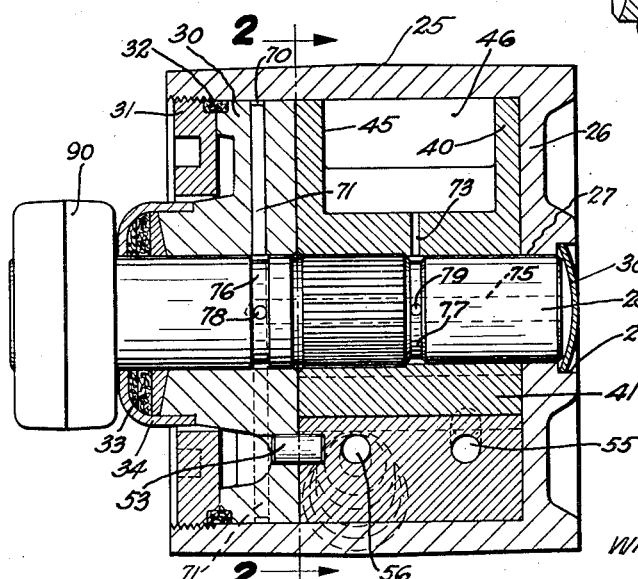
Figure 3 is a longitudinal sectional view taken substantially along the line 3—3 of Figure 2.

The shock absorber comprises a cup-shaped cylindrical housing or casing 23 having perforated lugs 24 by means of which the housing is attached to the frame of the vehicle. As shown in Figure 3, this housing 23 comprises a cylindrical wall 25 and an end wall 26, the end wall having a central aperture 27 in which the one end of the operating shaft 28 is journaled. A counterbored portion 29 in the opening 27 is provided to receive a sealing plug 30 so as to prevent fluid leaks at this point.

Housing 23 has a removable end cover 30 provided with a central aperture coaxially aligning with the opening 27 in the end wall 26, in which the shaft 28 is also rotatably supported. The open end of housing 23 is interiorly threaded to receive the clamping ring 31 which maintains the end cover 30 in proper position relatively to the integral end wall 26. Any suitable packing ring 32 is provided in cooperating grooves formed in the adjacent surfaces of the end cover 30 and clamping ring 31 so as to prevent fluid leaks at this point. Any suitable packing 33 held in position relatively to the end cover 30 and the shaft 28 by a gland 34 is provided to prevent fluid leaks along the shaft 28.

Figure 2:
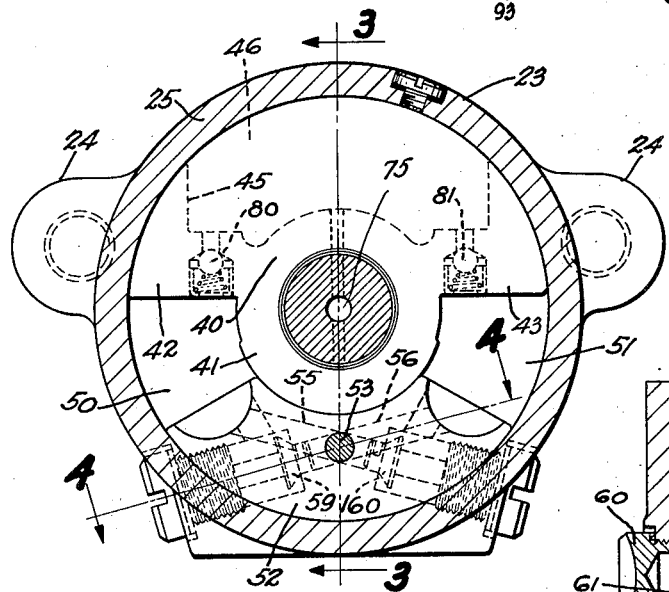
Figure 2 is a cross sectional view of the shock absorber taken substantially along the line 2—2 of Figure 3.

The space within the housing 23 between the integral end wall 26 and the removable end cover 30 may be termed the working chamber. Within this working chamber the shaft 28 has a piston 40 attached thereto so that said piston will rotate with said shaft. As shown in Figure 2, this piston 40 has a hub portion 41 and a wing providing oppositely disposed vanes 42 and 43, the outer ends of which slidably engage the inner, annular wall of the housing 23. This piston 40 is recessed as at 45, this recess cooperating with the annular wall of the housing 23 to form a reservoir 46, which is of constant size and in which the fluid is contained substantially at atmospheric pressure.

The portion of the working chamber on the side of the piston opposite the reservoir 46 is divided into two fluid displacement chambers 50 and 51 by a stationary partition 52 secured within the shock absorber casing by the screw plugs 60 of the fluid flow control devices, later described and by a pin 53, one end of which extends into a hole in the partition, the other into an opening in the end cover 30 as shown in Figure 3. The hub 41 of the piston, as shown in Figure 2, slidably engages a similarly shaped surface of the partition 52. In this partition fluid flow control devices are provided which control the transfer of fluid between chambers 50 and 51 as the piston 40 is reciprocated. One fluid flow control device is provided in the duct 55, this device regulating the fluid flow from chambers 50 and 51, but permitting no fluid to flow in a reverse direction between said chambers. The other duct 56 has a valve acting in the opposite direction, thus permitting fluid to flow only from chamber 51 to chamber 50. Inasmuch as both of these fluid flow control devices are practically alike, only one will be described detailedly.

Figure 4:
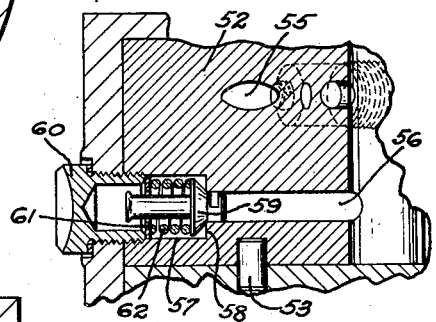
Figure 4 is a fragmentary detailed sectional view taken along the line 4—4 of Figure 3 and illustrating in detail one of the fluid flow control devices.

Referring to Figure 4, we find that the duct 56 has an enlarged portion 57, providing a shoulder 58 which forms a seat for the flanged valve 59. The open end of this duct portion 57 extends to the outside of the shock absorber, it being interiorly threaded to receive the plug 60. Plug 60 has a washer 61 engaging its inner end, this washer acting as an abutment member for one end of the spring 62 interposed between the washer and the flanged valve 59. This spring yieldably maintains valve 59 in a position which normally closes communication between chambers 51 and 50 respectively. As the piston is rotated clockwise as regards Figure 2, pressure is exerted upon the fluid in displacement chamber 51 and, when said pressure attains a proper value, valve 59 will be moved from its seat to permit a restricted fluid flow from chamber 51 through duct 56 into the chamber 50. The same is true as regards the flanged valve 160 provided in duct 55, which valve will permit fluid to flow from chamber 50 to the chamber 51 only when the fluid pressure within chamber 50 has attained a proper value in response to counter-clockwise rotation of the piston 40.

A groove 70 is provided in the peripheral surface of the end cover member 30 substantially midway between the inner surface of the end cover member, which slidably engages the piston 40, and the outer edge of the end cover member which is grooved to receive the packing 32. This annular groove 70 leads into the opening in which the shaft 28 is journaled through a series of radial passages 71 provided in the end cover member. In the piston 40 a passage or duct 73 provides communication between the reservoir 46 and the opening in the hub of the piston through which shaft 28 extends.

The shaft, as may be seen in Figures 2 and 3, has a central passage 75 extending from its inner end adjacent the plug 30 toward the opposite end of the shaft. This shaft also has two annular grooves 76 and 77 provided in its peripheral surface, these grooves being in communication with the central longitudinal passage 75 through radial ducts or passages 78 and 79 respectively. As seen in Figure 3, the radial passages 71 in the end cover 30 align with the annular groove 76 in the shaft when the shock absorber is properly assembled, while duct or passage 72 of the piston aligns with the annular groove 77 in the shaft. The aforesaid ducts, passages and grooves provided in the end cover member, piston and shaft, form fluid-conducting devices to prevent fluid leaks to the outside of the shock absorber. If for any reason fluid should leak along the peripheral edge of the end cover member 30, that is, between said peripheral surface and the wall of the casing 23, due to the pressure on the working chambers, then said fluid, before reaching the packing 32, would enter the groove 70 in the end cover member, flow down through the radial passages 71, enter the annular groove 76 in the shaft, and, flowing through duct 78 and passage 75, duct 79, groove 77 in the shaft, would enter the reservoir through the passage 73 in the piston. Also, any pressure that might be exerted upon the fluid to cause it to flow along the contacting walls of the piston and integral end wall 26 of the housing, would enter the space between the plug 30 and the end of the shaft 28 and from there, flow to the reservoir in the casing via the passage 28 in the shaft, duct 79 and radial groove 77 and through the duct 73 in the piston. From this it may be seen that fluid leaks from the shock absorber, due to the high pressures generated therein, are practically eliminated.

Due to fluid leaks past the piston, the fluid supply in chambers 50 and 51 might possibly be reduced and thus affect the efficient operation of the shock absorber, these fluid leaks not being to the outside of the shock absorber, but from the chambers into the reservoir. To replenish the supply if such a leak has occurred, applicant provides two fluid supply valves 80 and 81 in the piston, each being adapted to permit fluid to flow from the reservoir to a respective displacement chamber, but not from the chamber into the reservoir.

If the axle 21 of the vehicle is moved to approach the frame 20, a clockwise movement of the shock absorber obtains and therefore pressure is exerted upon the fluid in chamber 51, causing a flow from said chamber past the valve 59 in duct 56 into chamber 50, the restriction to the fluid flow past said valve 59 resisting this approaching movement. At the same time if the fluid supply in chamber 50 has been diminished by fluid leaks mentioned above, then valve 80 may open against the effect of its spring to permit a supply of fluid to flow from the reservoir 46 into said chamber 50.

As the axle is moved away from the frame in response to the rebounding movement of spring 22 or the upward movement of the vehicle frame 20, a counter-clockwise rotation of the shock absorber is obtained, causing the piston to exert pressure upon the fluid within chamber 50, thus a restricted flow of fluid is permitted by valve 50 through duct 55 into the chamber 51, the restriction of valve 60 to the fluid flow causing the shock absorber to resist this separating movement between the vehicle axle and frame.

In Figure 1 the connection of the shock absorber with the axle is shown. The end of the shaft 28 extending from the shock absorber has one end of an arm 90 attached thereto, the opposite end of said arm having one end of a link 91 swivelly secured thereto, the other end of said link being secured to a bracket 93 which is anchored to the axle 21 in any suitable manner.

Among the features of the present invention are compactness and simplicity of the device, the recess in the piston forming the reservoir 46 being the contributing factor to the compact structure, for it may readily be seen that providing the shock absorber with an outside reservoir would necessitate a larger structure. In this instance the piston is so designed that, even though it is recessed to provide a reservoir, still ample fluid displacement space is provided in the shock absorber to permit it to offer sufficient resistance for body and axle control.

Another feature is the accessibility of the valves from outside the shock absorber, thus permitting adjustments, repairs or replacements to be made in the actual control elements of the shock absorber without necessitating the arduous task of removing the entire device from the vehicle.

While the form of embodiment of the present invention as herein disclosed constitutes a preferred form, it is to be understood that other forms might be adopted, all coming within the scope of the claims which follow.

What is claimed is as follows:

1. A hydraulic shock absorber comprising, in combination, a cup-shaped casing; a rotatable piston in said casing, having a recess cooperating with the casing wall to provide a fluid reservoir; a partition cooperating with the piston to form two fluid displacement chambers, said partition having passages, each of which is provided with a mechanism including valve, spring and plug members to control fluid flow between said chambers in response to rotation of the piston, the plug member of said fluid flow control mechanisms acting also to secure the partition within the casing; and check valves in the piston each adapted to permit fluid to flow from the reservoir into a displacement chamber, but to prevent a reverse flow.

2. A hydraulic shock absorber comprising, in combination, a cup-shaped casing; a rotatable piston in said casing, having a recess cooperating with the casing wall to provide a fluid reservoir; a partition cooperating with the piston to form two fluid displacement chambers, said partition having two separate passages providing communication between said chambers; a fluid flow control device in each passage, comprising a screw plug and a spring loaded pressure relief valve, each valve being accessible from outside the casing by removal of its screw plug, the plugs of said passages providing means for holding the partition in position; and check valves in the piston, permitting fluid to flow only from the reservoir into the respective displacement chambers.

3. A hydraulic shock absorber comprising, in combination, a cup-shaped housing provided with a removable end plate; a shaft rotatably supported by a wall of the housing and said end plate so as to be substantially coaxial of the housing, said shaft having a plurality of annular grooves in its peripheral surface and a longitudinal duct connecting said grooves; an annular duct in the peripheral surface of the end plate, connected with one of the grooves of the shaft by radial passages in the end plate; a piston in the housing secured to the shaft to rotate therewith and having a recess which cooperates with the housing to provide a fluid reservoir; a duct in the piston connecting said reservoir with another groove in the shaft; and leak-resisting packings provided between the shaft and end plate and the housing and end plate.

WILLIAM A. CHRYST.